United States Patent [19]
Taylor

[11] 3,819,439
[45] June 25, 1974

[54] METHOD OF MAKING HONEYCOMB OF SINTERABLE MATERIAL EMPLOYING STEPWISE COATING OF A RESIN-CONTAINING COMPOSITION

[75] Inventor: Robert S. Taylor, Livermore, Calif.

[73] Assignee: Hexcel Corporation, Dublin, Calif.

[22] Filed: Oct. 5, 1972

[21] Appl. No.: 295,333

Related U.S. Application Data

[63] Continuation-in-part of Ser. No. 144,113, May 17, 1971, abandoned.

[52] U.S. Cl............................ 156/89, 65/23, 65/42, 156/197, 156/290, 264/56, 264/58, 264/60
[51] Int. Cl......................... C04b 39/12, B32b 3/12
[58] Field of Search............. 156/89, 155, 197, 278, 156/279, 291, 222; 65/23, 33, 42; 117/70 B, 125; 264/56, 58, 60, 125

[56] References Cited
UNITED STATES PATENTS

| | | |
|---|---|---|
| 2,983,640 | 5/1961 | Knoll et al.................... 156/197 |
| 3,112,184 | 11/1963 | Hollenbach..................... 156/89 |
| 3,251,403 | 5/1966 | Smith............................. 156/89 |
| 3,272,686 | 9/1966 | Smith et al.................... 156/89 |
| 3,600,249 | 8/1971 | Jackson et al................ 156/197 |

Primary Examiner—Douglas J. Drummond
Assistant Examiner—Frank Frisenda, Jr.

[57] ABSTRACT

Sinterable materials are employed in preparing regular honeycomb structures by preparing a sheet of a sinterable material and a resin binder, normally by coating a porous carrier with a light first coating of a composition containing a sinterable material and a resin binder. Node bonds are printed onto the sheet and the sheets are then stacked with the node bonds in appropriate spatial relationship. The stack is cured and the sheets are expanded in a warm aqueous environment to provide a green stock of honeycomb structure. The green stock is coated with additional coats of sinterable material and resin binder. The resulting honeycomb structure is then fired to provide a stable, highly uniform, expanded honeycomb structure of excellent strength and uniformity.

18 Claims, 2 Drawing Figures

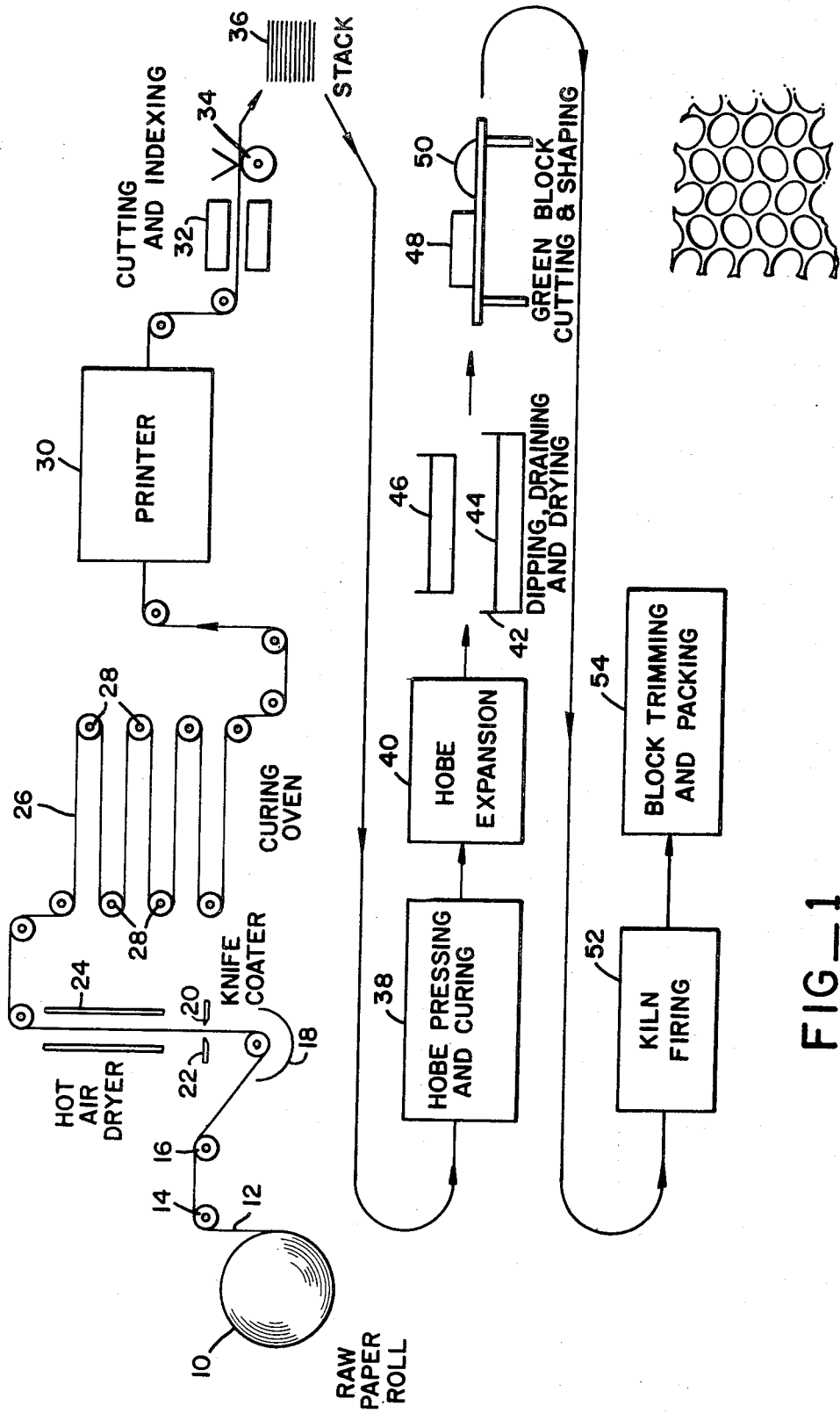
FIG_1
FIG_2

METHOD OF MAKING HONEYCOMB OF SINTERABLE MATERIAL EMPLOYING STEPWISE COATING OF A RESIN-CONTAINING COMPOSITION

CROSS-REFERENCE TO COPENDING APPLICATIONS

This application is a continuation-in-part of application Ser. No. 144,113, filed May 17, 1971 now abandoned.

BACKGROUND OF THE INVENTION

1. Field of the Invention

Honeycomb structures have a number of desirable characteristics for many applications. The nature of the honeycomb structure is to provide a high surface to volume area and to allow for directed flow of a fluid through the channels of the structure. Furthermore, depending on the material employed in fabricating the honeycomb structure, a porous structure can be achieved, greatly increasing the available surface area.

Structural materials used for the honeycomb which can be prepared from sinterable materials include ceramics, metals, and combinations thereof, i.e., cermets. The wide range of sinterable materials which can be fabricated into honeycomb structures permits a broad spectrum of applications for the honeycomb. The materials employed for the honeycomb structure may have inherent properties which are desirable or may be used as supports for other materials to achieve the desired function.

Ceramic articles can have uses such as regenerators, radiators, catalyst carriers, filters, insulation, and the like. The ceramic quality of the honeycomb provides high temperature stability, relative chemical inertness (although ceramics can be prepared having basic or acidic characteristics), good corrosion resistance and low expansion.

While ceramics have many highly desirable qualities, after sintering, ceramics cannot be worked and require extremely high temperatures for fabrication into various shapes. Ceramics are not compatible with a wide variety of materials. For use in honeycomb structures, ceramic forming materials may be worked prior to sintering, as powders or small granular particles, but in such form they cannot provide structural support. Therefore, alternative methods must be found in order to provide structural support for the powders or granules during the fabrication of the honeycomb, while not interfering with the formation of the honeycomb structure or imparting undesirable properties or impurities to the honeycomb structure. Similarly, cermets display the same types of difficulties as in preparing honeycomb structures.

Malleable metals can be used to prepare films, which may then be brought together to form honeycomb structures. However, the films are held together by adhesives, which cannot withstand high temperatures or corrosive environments. Furthermore, the number of metals which can satisfactorily be held together by conventional adhesives is limited. In many instances, metals and metal alloys cannot be readily formed into thin films, so that alternative methods are required for forming a honeycomb structure.

2. Description of the Prior Art

U.S. Pat. Nos. 2,977,265 and 3,112,184 teach ceramic structures using a porous flexible carrier. U.S. Pat. Nos. 3,272,686, 3,473,938 and 3,473,987 teach ceramic structures, either based on aluminum carriers or based on a special flux. U.S. Pat. No. 3,444,925 teaches the fabrication of ceramic and metal honeycomb structures. Another patent of interest is Canadian Patent No. 759,003.

SUMMARY OF THE INVENTION

Ceramic, metal, metal alloy and cermet honeycomb structures are provided which may be used directly or modified by oxidation, deposition, coating and the like to be used for a variety of purposes. A self-sustaining layer of sinterable powder and resin is formed and printed with node bond adhesive. The layers are stacked, so that upon curing of the adhesive and expansion of the stack a honeycomb structure is formed, which is coated with additional sinterable material and resin. After burning off the organic material, the sinterable material is sintered to form the desired honeycomb structure.

DESCRIPTION OF THE DRAWINGS

FIG. 1 is a schematic of the process of this invention; and

FIG. 2 is a plan view of a portion of an expanded core.

DESCRIPTION OF THE SPECIFIC EMBODIMENTS

A method for preparing honeycomb from sinterable material and the honeycomb prepared thereby are provided. Powders or granules of sinterable material are combined with a resin binder and coated onto a porous sheet or carrier, or formed on a supporting film to provide sheets of sinterable material and binder. After curing the binder, adhesive node bonds are printed onto the sheets and are placed in stacks with the node bonds on the different sheets in appropriate juxtaposition. After curing the adhesive node bonds, the stack is expanded, coated with additional composition containing granules of the sinterable material and binder and then sintered to provide the stable honeycomb structure.

Turning to a consideration of FIG. 1, 10 is a roll of the carrier. While individual sheets may be used, for convenient production, it is most convenient to have the carrier as a continuous roll. The carrier is a highly porous flexible material, normally paper or cloth, preferably paper.

Illustrative carriers include cellulose acetate paper, onionskin paper, randomly oriented fibrous paper, teabag paper, rayon or nylon cloth, etc.

The carrier should be from about 3 to 12, usually 5 to 10 pounds per ream, so as to provide maximum porosity, while still providing structural support. Preferably, the carrier should have from about 65 to 85 percent porosity, so as to minimize the amount of organic matter present which must be burned away during the sintering, and allow uniform distribution of the coating. Preferred paper is 8 pound porous paper, much like teabag paper. The carrier roll 10 may be any convenient width depending on the size of the core desired and subsequent modification and trimming. The width may vary from a few inches to a few feet, being dictated primarily by the final use and the size of the equipment available.

The carrier or porous support 12 is fed from roll 10 by means of rollers 14 and 16 into a slurry bath 18. The slurry is a combination of a sinterable material, as a powder or granules, a resin and a low viscosity liquid. When preparing metal or cermet honeycomb, an anti-settling agent is also used.

The ceramic composition can be of any of a variety of sinterable materials being dictated substantially by the physical properties desired in the final product. The ceramic material may be crystalline or amorphous and includes glasses, such as borosilicates, soda lime, silicates, lead-silicates, alumino-silicates, alkaline earth silicates, etc.; refractory compositions, such as sillimanite, magnesium silicates, magnesia, zircon, zirconia, petalite, spodumene, cordierite, alumina, alumina-silicates, etc.; the glass-ceramics; and carbides, silicilides, borides and nitrides such as silicon carbide and boron carbide; or combinations thereof. Also, non-metallic elements, such as silicon and carbon may find uses, particularly in combination.

Various fluxes may be incorporated with the ceramic material, such as talc, and oxides of alkali metals, alkaline earth metals, vanadium, chromium, molybdenum, tungsten, copper, silver, zinc, antimony and bismuth. Precursors of these oxides, such as the hydroxides, may also be used. Usually, from about 1 to 10 weight percent of the ceramic composition will be a flux, the preferred flux being talc.

The preferred ceramic compositions are alumina and the alumino-silicates, including lithium aluminum silicate, magnesium aluminum silicate and aluminum silicate (petalite, cordierite and mullite).

For the metal and cermets, a wide variety of metals, metal alloys, and metal oxides can be employed. Among the metals which may find use, as metals, their oxides or mixed oxides, are nickel, iron, copper, chromium, cobalt, beryllium, bismuth, gold, silver, lead, magnesium, manganese, molybdenum, platinum, rhenium, tantalum, tin, tungsten, titanium, zinc, lanthanum, and aluminum, either by themselves or in combination. Oxides may be exemplified by copper oxide, nickel oxide, iron oxide, copper chromate, manganite, and lanthanum cobalt trioxide.

Materials other than metals may be present, such as carbon in stainless steel. In effect, any metal, metal alloy or the like may be used by itself or in combination, where the metal, metal alloy or the like is sinterable to a stable structure. To prepare a cermet, nickel oxide, copper oxide, aluminum oxide, cobalt oxide, chromium oxide or iron oxide may be used with various metals to provide the desired cermet. The ratio of metals and alloys in cermets may be varied widely, in order to achieve the desired properties.

The sinterable material is present in the slurry as extremely fine particles, preferably of a size less than about 200 mesh, and usually of a size less than about 250 mesh (ASTM sieve). The particle size will usually be less than about 300 mesh. For the ceramic composition, this size is readily achieved by grinding the ceramic composition in a ball mill for an extended period of time. The metals are frequently commercially available as powders of the proper size and may be used directly. Usually, the metal pwoder should have small irregular particles and be relatively free of very fine powder.

Combined with the sinterable material is a resin binder, usually plasticized. The role of the resin binder is to bind the powder to the carrier so as to maintain the structure of the green stock, prior to the coating of the green stock with additional coats of sinterable material and subsequent sintering. In addition, the resin binder must be compatible with the node bond adhesive, forming a strong bond between the adhesive and the resin, without allowing the adhesive to permeate the carrier during the processing to introduce adhesive to the other side of the carrier causing blocking. Furthermore, the resin must be curable in the presence of the sinterable composition and the cured composition must provide the necessary inertness and flexibility, which is required during the processing.

Various resins may be used to provide the necessary strength and compatibility. Included among the resins are polymers, such as acrylate, methacrylate, polyvinyl butyral and melamine, as well as other resins which can provide the necessary adhesion, and be curable to a composition which provides the desired mechanical strength and flexibility. A list of resins may be found in U.S. Pat. No. 3,079,273.

At room temperature, the resin should be dry, not tacky. In addition, the polymer should be solvent resistant when cured, so that the solvent chosen for dispersing the sinterable material resin composition should not dissolve the polymer to a significant extent.

The resins employed may be thermosetting or thermoplastic, preferably thermosetting.

The preferred resins are acrylic resins which are partially hydrolysed to an acid number of at least 50 and not more than 100, normally in the range of about 60 to 80 mg. KOH/g. The molecular weight after curing will be at least about 50,000 molecular weight and not more than about 500,000 molecular weight, normally in the range from about 75,000 to 250,000 weight average molecular weight.

A convenient acrylic resin is Carboset, particularly No. 531, having an acid no. of from about 60 to 70. Carboset No. 531 is provided as 25 weight percent solids in water, having a viscosity of about 2,000 centipoises at 20° C.

Usually, in combination with the acrylic resin is a high molecular weight plasticizer, having a molecular weight of at least 300 and usually not exceeding 500. Various plasticizers may be employed, such as glycol esters, polyoxyalkylene glycols and their esters. The preferred plasticizers are diesters of glycols, such as diethylene glycol, dipropylene glycol, etc. Monobasic aromatic acids will normally be employed, such as benzoic acid, toluic acid, etc.

Illustrative plasticizers are the dibenzoate of diethylene glycol, dibenzoate of dipropylene glycol, and the ditoluate of diethylene glycol.

The plasticizer will be present in at least 10 weight percent based on the resin-plasticizer composition, usually not more than 50 weight percent and preferably from about 12 to 45 weight percent. In the ceramic composition, the plasticizer will usually be at least 25 weight percent and usually 35 to 45 weight percent, while with the metal containing compositions, the plasticizer will be at least 10 weight percent and usually 12 to 35 weight percent.

The sinterable material will usually be at least 60 and not more than about 95, generally from about 65 to 85 weight percent of the combination of sinterable material, resin and plasticizer. It is found that at least 5, usually 10, weight percent of the sinterable material resin-composition must be organic binder in order to be able to carry out the subsequent processing steps.

With materials for ceramic honeycomb, the ceramic material will generally be from about 70 to 90 usually from about 75 to 85 weight percent of the combination of ceramic composition, resin and plasticizer. With the metals and cermets, the sinterable material will generally be from about 65 to 85, more usually 70 to 85 weight percent of the combination of sinterable material, resin and plasticizer.

Also included in the slurry is a liquid diluent for ease of handling. Various liquids may be used such as alcohols, ethers, ketones, etc., preferably lower alkanols of from 1 to 3 carbon atoms. The amount of liquid employed will normally provide a final composition having from about 30 to 50 weight percent solids. Primarily, it is a question of viscosity, the slurry usually having about a 20 to 40 second viscosity as determined with a Zahn No. 2 cup, more usually from about 25 to 30 second viscosity.

As required, particularly with the metal powders, an anti-settling agent will be employed. Anti-settling agents prevent clumping of the metal powder on standing, so that the powder can be readily dispersed with stirring. Illustrative anti-settling agents are alkyl ethers of polyalkyline glycols, alkylarylpolyether alcohols, polyoxyethylene esters, and the like. The amount of the anti-settling agent will be from about 0.5 to 5 weight percent of the total composition.

The slurry is agitated by means not indicated in the drawing, so as to provide a substantially homogeneous dispersion of the sinterable composition and resin binder in the slurry. In this way, a uniform coating of the slurry on the carrier is achieved. The amount of slurry introduced as the first coat (normally, additional coatings are contemplated) can be varied.

When preparing ceramic honeycomb, the amount of slurry provided as the first coat will normally be in the range to provide a density of honeycomb of from about 2 to 12 lbs. per cubic foot, preferably from about 3 to 8 lbs. per cubic foot. That is, the honeycomb as the green core and not after sintering. The initial coating will provide from 10 to 50, more usually 12 to 30 weight percent of the weight of the final ceramic product. For the metals, metal alloys and cermets, the coating will provide a density for the green core of 20 to 100, usually 30 to 80, providing from 10 to 50, usually 15 to 40, weight percent of the final product.

Where a porous carrier is not employed, a sheet of the sinterable material and resin may be formed on an inert supporting carrier. The resin will usually be high molecular weight polymers, e.g., acrylates, methacrylates, polyalkenes, etc., which are substantially insoluble in the usual solvents, but can be plasticized at elevated temperatures. The resin, sinterable material and plasticizer can be combined as a slurry in a suitable liquid medium and cast. The mixture can then be heated, whereby the plasticizer enters the polymer particles, softening the particles so as to form a continuous sheet, while capturing the particles of sinterable material. Upon cooling, a self-sustaining sheet is obtained which is then processed in the same manner as the impregnated porous sheet.

The coated carrier is then passed through a dryer, so as to evaporate substantially all of the solvent. Any convenient means for drying may be achieved, warm air being satisfactory.

Passing from the dryer 24, the coated carrier, which is still highly flexible, is then passed into a curing oven 26. The curing oven is maintained at a temperature in the range of about 250° to 375° F, more usually 275° to 325° F, and serves to cure the resin composition, so as to provide structural stability and a stable base upon which to print the adhesive. The time for curing will be varied widely, depending on the temperature at which the curing is carried out, the particular polymer employed, and the degree of curing desired. At the temperature range indicated, the curing time will vary from 1 to 60 minutes, usually 3 to 30 minutes.

As shown in the drawing, the time of curing can be controlled by the length of time in which the impregnated carrier spends in the oven, which is controlled by the length of the path provided in the oven. The length of the path is extended by having the carrier move backward and forward over a plurality of rollers 28 in the oven. The sheet as it comes from the oven is cured, but is still soft and flexible, easily bends around relatively sharp turns without cracking, and is substantially dust free.

From the curing oven, the impregnated sheet goes to the adhesive node printer. Methods of printing adhesive nodes may be found in a large number of patents, including U.S. Pat. Nos. 2,610,934, 2,734,843, 2,893,640 and 3,074,839.

The carrier is continuously fed through a rotogravure printing head assembly 30 indicated generally, which prints adhesive node bonds across the width of the carrier transverse to the direction in which the carrier is moving. The width of the node bonds, the spacing of the node bonds, and the amount of adhesive employed will vary depending upon the structure of the honeycomb which is desired. Also, in determining the width of the expanded core, the number of printed sheets needed per inch of core will vary with the cell size. For example, for an one-eighth inch cell, there will be a stack of 16 sheets, while for a three thirty-seconds inch cell, there will be a stack of 21 sheets. The width of the node bond will usually be from about one-sixteenth to one-twentieth of an inch. In some applications, the adhesive node may not extend the full width of a carrier sheet.

The particular adhesive employed is a heat curable adhesive, which will not permeate the coated carrier and will provide a clean line. The cure temperature must be at relatively mild temperatures, not exceeding about 450° F, preferably not exceeding 400° F.

The preferred resins are vinyl resins, particularly esters of from four to eight carbon atoms, such as vinyl acetate, methyl acrylate, ethyl acrylate, etc. The resins may be modified by partial hydrolysis to provide free carboxy groups (see earlier discussion) or free hydroxy groups. The hydrolysis will usually be at least 1 mol percent, and usually not exceed about 25 mol percent.

Preferably, the adhesive employed is a partially hydrolysed vinyl ester, such as vinyl acetate as an emulsion. Illustrative vinyl acetate adhesives include Korlock, supplied by National Starch Co.

Usually a cross-linking agent will be employed to cure the resin. With the vinyl acetate, the cross-linking agent normally employed is a low molecular weight phenolformaldehyde resin. Upon curing, a strong bond is formed between the vinyl acetate and the phenolic resin, so as to maintain structural stability during the rest of the processing, and allow hobe expansion without loss of the node bonds.

As a preferred embodiment, an agent is added to the adhesive composition, particularly the vinyl acetate composition, in from 0.5 to 8 weight to enhance the tack of the adhesive. A few percent of a relatively high molecular weight polyol-ether is satisfactory, such as diethylene glycol, butyl carbitol, methyl cellosolve, etc.

When metal is employed in the preparation of metal or cermet honeycomb, it is frequently desireable to add a small amount of a wetting agent, to the node bond adhesive, usually from about 1 to 5 weight percent, more usually from about 2 to 4 weight percent of the total node bond adhesive composition. Convenient wetting agents are polyoxyethylene derivatives of mono and polyesters, such as the polyoxyethylene derivatives of mono and polyesters of sorbitan, sold under the Tween trademark, particularly Tween 85 which is the polyoxyethylene derivative of sorbitan trioleate. Other wetting agents include polyethylene glycol derivatives of stearate, ricinoleate, and the like. In addition, a small amount of anti-foaming agent may be used, normally being from about 0.1 to 1 weight percent of the total node bond adhesive composition. Conveniently, various siloxanes may be used which are commercially available.

From the printer 30, the carrier sheet then travels to a cutter 32, and indexer 34, respectively, so as to provide a stack of sheets 36 with the adhesive node bonds in appropriate juxtaposition.

When the appropriate number of sheets have been stacked, the stack is then moved to a curing oven-press 38, where by appropriate pressure and heat, the adhesive is cured to provide a stable bond between two sheets along the printing line. In order to insure uniform heating through the stack, a heated platen press can be conveniently employed. The temperature in the press will normally be from about 250° to 350° F, while the pressure will be as low as feasible, usually from about 20 to 80 psi.

Once the adhesive node bond is cured, it is substantially impervious to attack by hydroxylic solvents, at least over a short time duration, so that the bond is maintained during subsequent processing, prior to sintering.

Upon cooling, the stack of sheets is expanded by introducing the stack into a warm liquid bath 40. The stack may be held in a variety of ways, for example, by use of expander machines, or other means known in the art.

The bath in which the expansion is carried out will be a fluid inert to the resins, and preferably water or other low molecular weight hydroxylic solvent. The temperature at which the expansion is carried out will normally be in the range of about 60° to 90° C. The expanded block has a substantially hexagonal cell, like the normal expanded honeycomb and subject to the extensive shrinkage, which the honeycomb will undergo during sintering, is substantially the final structure.

In order to enhance the structural stability and wall thickness and strength, the honeycomb 46 is now dipped into a sinterable material resin slurry bath 42, one or a plurality of times to increase the amount of sinterable material present on the walls. The sinterable material-resin composition 44 will have at least 60 and preferably at least 65 weight percent of the sinterable material. Where the sinterable material is for forming a ceramic, normally, there will be at least 85 and more usually at least 90 weight percent of the ceramic forming material, generally not more than 95 weight percent. With metals or cermets, the amount employed will be similar, usually being at least 80 weight percent and not exceeding 99 weight percent, preferably from about 80 to 98 weight percent. Above 99 weight percent, bonding becomes unsatisfactory, and imperfections are found in the final product.

While the same or different sinterable material may be used, as was used for the base coating, normally, to avoid differences in the thermal coefficient of expansion between different materials, the same sinterable material will be employed. The resins employed may be the same or different than the one used in the initial sinterable material resin composition. Preferably, a different resin is used which is a polyvinyl butyral mixed with up to 15 weight percent based on the total composition of a melamine resin. The polyvinyl butyral resin will have a weight average molecular weight of about 100,000 to 500,000, more usually from about 150,000 to 300,000. The specific gravity 23° C/23° C will be about 1 to 1.2, while hydroxyl content reported as polyvinyl alcohol will vary from about 15 to 25 weight percent.

These resins are commercially available from Union Carbide and Monsanto, the latter provides them under the Butvar mark.

The melamine resin will have a density of about 9.5 to 10.5 pounds per gallon. Its viscosity will be W-2 (Gardner-Holdt).

Also, with metal powders, a small amount of an anti-settling agent will be added, the same ranges as indicated previously, to allow for redispersal of the metal powder upon agitation.

The sinterable material and resin are dispersed in a convenient liquid medium, preferably a hydroxylic medium, such as lower alkanols (one to three carbon atoms) or combinations thereof. The amount of liquid medium employed will depend on the viscosity, the range of viscosities described for the first sinterable material resin composition being preferred.

The expanded core 46 may be dipped 1 or more times, usually not more than about 4 times, conveniently from about 2 to 3 times. Each dipping will enhance the weight of sinterable material which is available in forming the walls. Therefore, depending on the desired wall thickness, the size of the cells, and the desired final density, as many dippings will be employed as required. After each dipping, the core is allowed to drain and dry. To provide uniformity of wall thickness the core will usually be dipped successively, first from one side and then from the other side. In this way, differences in draining are compensated.

Up till this point in the processing, the first coat has provided the necessary mechanical stability and flexibility to be moved, printed, node bonded, and then expanded. The first coat has provided less than about one-half the final weight, usually less than about one-third of the final weight of the honeycomb. The second and subsequent coats will provide from about 50 to 90 weight percent, more usually from about 65 to 80 weight percent of the final honeycomb after sintering.

After drying, the block 48, referred to as green stock, is ready to be formed as desired. The block may be cut, vertically, horizontally, or obliquely or may be shaped in any way, for example, as a hemisphere 50. In shaping the block, consideration must be given to the extensive amount of shrinkage which occurs upon firing.

The green block 48 after being cut and shaped is then introduced into the kiln or furnace 52. The firing procedure will vary to some degree depending on the material employed. With all the materials, the green stock will be heated to 800° F, usually 900° F and less than about 1500° F, in an oxidyzing atmosphere to completely oxidize and remove the organic materials which are present. With the ceramic or non-metallic materials, which are inert to oxidation, this is generally achieved as the material is being heated to its sintering temperature, usually at least 2000° F and generally not exceeding 4000° F, usually in the range of 2200° to 2700° F. The temperature is then maintained at the sintering temperature until a product of the desired properties is achieved.

With the metals, cermets or other oxidation sensitive material, after the organic material is completely oxidized, at a temperature below 1500° F, usually in the order of 1 to 6 hours, the oxidizing atmosphere is replaced with a nonoxidizing (inert or reducing) atmosphere and the temperature raised to the sintering temperature of the metal, cermet or other oxygen sensitive material. Various gases can be used, such as hydrogen, disassociated ammonia, nitrogen, argon, or the furnace can be evacuated so as to provide a vacuum.

The sintering temperature of the metal will normally be in excess of 1200° F and usually be below 3,000°F. For example, copper can be sintered at about 1,500° F, while Monel metal, a nickel-copper alloy, will normally require from about 2100° to 2300° F. Sintering temperatures are either well known or can be readily determined. The time for firing will generally be from about 1 to 24 hours. The time of sintering affects the porosity of the product, so that the longer the sintering time for a given temperature, the lower the porosity and the denser the product. When the sintering is considered complete, the honeycomb is allowed to cool at any rate that is compatible with the proper performance of the firing equipment employed.

The final product has the appearance as indicated in FIG. 2. The cells are roughly elliptical or hexagonal having 6 sides and substantially uniform. As a final stage 53, the honeycomb may be subjected to minor trimmings or other modifications prior to use.

To further demonstrate the subject invention, the following process was carried out to provide a white uniform structurally stable honeycomb. The carrier employed was 8 lb. porous paper which was cut into sheets of about 2 × 4 feet. A composition was prepared having 80 weight percent of a mixture of petalite (95 wt. percent) and talc (5 weight percent) with 20 weight percent of a mixture of a carboxy modified acrylic resin, Carboset No. 531 (25 wt. percent solids in water; acid no. 60–70) (60 weight percent based on solids) and diethylene glycol dibenzoate (40 weight percent). The ceramic mixture and the resin mixture were combined and methanol added to obtain a viscosity of 27 seconds, Zahn No. 2 Cup, the mixture having about 35–45 weight percent solids. The petalite and talc had been ground for 16 hours in a ball mill to provide a mexh size (ASTM) of less than 400.

The sheets were individually passed through the slurry, which was stirred, through the knife coater, so as to maintain substantial uniformity, and then hung on a line to dry. The sheets were cured at 300° F for 30 minutes, after which the adhesive node bonds were printed on the sheets, the node bonds being of one-twentieth inch width spaced to provide a one-eighth inch cell. The adhesive employed was a vinyl acetate emulsion combined with a phenol-formaldehyde cross-linking agent (Korlock, supplied by National Starch Co.). The sheets were then stacked to give a pile of 300 sheets, the node bonds being present in staggered relationship.

The stack was then introduced into a platen press and cured at 300° F, under 50 psi pressure. After the curing, the pile was set into an expander, by adhering holders to the ends of the sheets and fastening the holders in an appropriate clamp. Th block of sheets was then treated with hot water (60°–70° C), so that it was thoroughly and uniformly wetted. By spreading the holders apart, the sheets were expanded to a honeycomb structure and permitted to dry.

A second slurry was provided having a ceramic-resin composition containing 90 weight percent of the same ceramic composition previously described and 10 weight percent of 85 parts of polyvinyl butyral resin (Butvar B-72, supplied by Monsanto Co.), and 15 parts of a melamine resin (Resimene X-745, supplied by Monsanto Co.). Butvar B-72 is reported to have a weight average molecular weight of about 180–270 × $10^3$, an hydroxyl content as weight percent polyvinyl alcohol of 17.5–21.0, and a butyral content as weight percent of vinylbutyral of 80. The specific gravity is reported at 23°C/23°C as 1.1. Resimene X-745 is reported to be 98 weight percent minimum non-volatile, viscosity W-2, Gardner-Holdt, and to have a density of 9.9–10.0 lbs. per gallon. The slurry employed 95 percent ethanol as the liquid to provide a viscosity similar to that for the first composition.

Prior to coating, 8 lb. porous paper expanded into a theoretical honeycomb structure of one-eighth inch cell size would have a density of about 0.7 lbs. per cubic foot. After the first coating and drying in air, the honeycomb when expanded would have a density in the range of about 4 to 6 lbs. per cubic foot at one-eighth inch cell size. After a series of dips, the density of the dried honeycomb core was increased to a density in the range of about 20 to 22 lbs. per cubic foot. The honeycomb was introduced into a kiln and fired to about 2,300°F. The kiln was then allowed to cool, and the honeycomb removed. The honeycomb had about a 65 percent total volume shrinkage and had a density of about 25–30 lbs. per cubic foot. The structure of the honeycomb is extremely uniform and strong. By careful processing, it is obtained substantially free of significant imperfections, particularly those which are not readily trimmed away.

Substantially following the procedure described above, a number of additional honeycombs were prepared employing the compositions described below in the following table, with any modifications of the procedure being indicated:

| Honeycomb | Monel | Stainless Steel | Copper |
| --- | --- | --- | --- |
| Base Coat[1], parts by weight | | | |
| Metal | 69.1[1] | 66.60[2] | 69.1[3] |
| Resin | 17.5 | 18.85 | 17.5 |

-Continued

| Honeycomb | Monel | Stainless Steel | Copper |
|---|---|---|---|
| Plasticizer | 2.9 | 3.14 | 2.9 |
| Anti-settling agent | 1.6 | 1.80 | 1.6 |
| Solvent | 8.9 | 9.61 | 8.9 |
| Additional Coats[5], parts by weight | | | |
| Metal | 72.0[1] | 72.90[2] | 72.0 |
| Resin:   A | 1.75 | 1.91 | 1.75 |
| B | .71 | .74 | .71 |
| Anti-settling agent | 1.90 | 1.95 | 1.90 |
| Solvent | 25.38 | 22.50 | 25.38 |
| Node bond adhesive[6], parts by weight | | | |
| Resin | 95.1 | 95.1 | 95.1 |
| Tackifier | 1.2 | 1.2 | 1.2 |
| Anti-foaming agent | 0.7 | 0.7 | 0.7 |
| Wetting agent | 3.0 | 3.0 | 3.0 |
| Sintering temperature, °F. | 2100–2300 | 2100–2300 | 1500 |
| Time: total hours | 13 | 13 | 13 |
| at sintering temperature | 2 | 2 | 2 |

1. Monel powder (70% Ni - 30% Cu) — 325 mesh
2. Stainless steel powder (316-L) — 325 mesh
3. Copper powder — 325 mesh
4. Resin — Carboset 531 (at 25% solids); supplied by B.F. Goodrich Co.
   Plasticizers — Benzoflex 9-88; supplied by Velsicol Corp.
   Anti-settling agent — Post-4; supplied by Baker Castor Oil Co.
   Solvent — methanol
5. Resin   A — Butvar — B-72; supplied by Monsanto Co.
   B — Resimine X-745; supplied by Monsanto Co.
   Anti-settling agent — Post 4; supplied by Baker Castor Oil Co.
   Solvent — ethanol (95%)
6. Resin — Korlok (modified polyvinyl acetate adhesive — ~50% solids; supplied by National Starch Co.
   Tackifier — diethylene glycol
   Anti-foaming agent — Anti-foam H-10; supplied by Dow-Corning Co.
   Wetting agent — Tween-85; supplied by Atlas Powder Co.

Following the above described procedure, various mixed metal compositions were employed to prepare metal honeycomb. Combinations of nickel or copper with Monel were employed in weight ratios varying from 1:1 to 1:9 to give honeycomb products which can act as catalysts or catalytic supports or be partially oxidized to nickel and copper oxides to provide catalytic activity.

The subject process provides a convenient method for processing ceramic, cermet or metal honeycomb by using a flexible carrier and coating the carrier with a powdered ceramic-resin, cermet-resin or metal-resin composition. For the most part, a minor portion of the ceramic, cermet or metal is present as the first coat. After drying and curing of the resin, sufficient flexibility with substantial mechanical stability is obtained for the subsequent processing steps. The sheets may then be printed with node bonds stacked in the appropriate orientation, and the node bonds cured without the sheets' blocking. The sheets are readily expandable into a honeycomb configuration, so as to form a structure which can then be coated with the remaining amount of ceramic composition. After drying, the structure is sintered to a stable substantially uniform honeycomb structure having excellent mechanical stability.

Although the foregoing invention has been described in some detail by way of illustration and example for purposes of clarity of understanding, it will be obvious that certain changes and modifications may be practiced within the scope of the appended claims.

What is claimed is:

1. A method for preparing a cellular honeycomb structure from sinterable material which comprises: forming a plurality of self-sustaining sheets of a first powdered sinterable material-resin composition, wherein the amount of sinterable material employed is from 10 to 50 weight percent of the total sinterable material to be employed in forming said honeycomb;

printing node bond adhesive lines onto one side of said sheet;

stacking said plurality of sheets with the node bond adhesive lines in appropriate juxtaposition to provide a honeycomb structure on curing and expansion;

curing said node bond adhesive lines and expanding said stack of sheets in a liquid medium to provide a honeycomb structure;

coating said honeycomb structure with a second powdered sinterable material-resin composition to provide the remaining amount of sinterable material; and drying and sintering said honeycomb structure to provide a stable honeycomb structure.

2. A method according to claim 1, wherein said sinterable material is a ceramic.

3. A method according to claim 1, wherein said sinterable material is a metal or metal alloy.

4. A method according to claim 3, wherein the metal or metal alloy comprises at least one metal of the group consisting of copper, nickel, iron, cobalt, chromium, manganese, vanadium, molybdenum, or lanthanum is present as the metal or oxide.

5. A method according to claim 1, wherein said sinterable material is a combination of at least one metal and at least one metal oxide.

6. A method for preparing ceramic honeycomb which comprises:

coating a first ceramic-resin composition onto a flexible organic carrier, wherein the amount of ceramic material coated onto said carrier is from 10 to 50 weight percent of the total ceramic material coated onto said carrier;

curing the resin to provide a flexible sheet with substantial mechanical stability;

printing node bond adhesive lines onto one side of said sheet;

stacking a plurality of sheets with the node bond adhesive lines in appropriate juxtaposition to provide a honeycomb structure on curing and expansion;

curing said node bond adhesive lines and expanding said stack of sheets in a liquid medium to provide a honeycomb structure;

coating said honeycomb structure with a second ceramic-resin composition to provide the remaining amount of ceramic material; and drying and sintering said honeycomb structure to provide a stable ceramic honeycomb.

7. A method according to claim 6, wherein the resin in said first ceramic-resin composition is a carboxy containing acrylic ester resin.

8. A method according to claim 7, wherein the resin of said second ceramic-resin composition is at least in part polyvinyl butyral.

9. A method according to claim 6, wherein said carrier is a porous paper of from 3 to 12 pounds per ream.

10. A method according to claim 1, wherein the ceramic of said first and second ceramic compositions is an alumino-silicate, as a fine powder of a size less than about 300 mesh, having from 1 to 10 weight percent of talc.

11. A method according to claim 6, wherein said first ceramic-resin composition has from 70 to 90 weight percent of the ceramic composition and from 10 to 30 weight percent of a resin composition comprising from 50 to 75 weight percent of a resin and from 50 to 25 weight percent of a plasticizer, said first ceramic-resin composition being dispersed in a hydroxylic liquid to provide a composition having from about 30 to 50 weight percent solids.

12. A method for preparing a stable ceramic honeycomb structure which comprises:
coating porous paper from 5 to 10 pounds per ream with a ceramic-resin composition dispersed in a hydroxylic medium, wherein the resin composition is present in from 15 to 20 weight percent of said ceramic-resin composition and is 55 to 65 weight percent of a carboxy modified acrylate resin and 35 to 45 weight percent of a compatible ester plasticizer and the ceramic is an alumino-silicate of a mesh size not greater than about 250 mesh, to provide a lightly coated sheet;
curing said resin composition at an elevated temperature;
printing node bond adhesive lines on one surface of said coated sheet;
stacking a plurality of said coated sheets with the node bond lines in appropriate juxtaposition to provide a honeycomb structure on curing and expansion;
curing said node bond adhesive at an elevated temperature and under a mild positive pressure;
expanding said stack of sheets with the aid of a warm hydroxylic media coating said expanded stack of sheets with a second ceramic-resin composition; and
drying and sintering said expanded stack to provide a stable ceramic honeycomb structure.

13. A method for preparing a stable metal or metal alloy honeycomb structure which comprises:
coating porous paper of from 5 to 10 pounds per ream with a sinterable metal or metal alloy-resin composition dispersed in a hydroxylic medium to provide a lightly coated sheet;
curing said resin composition at an elevated temperature;
printing node bond adhesive lines on one surface of said coated sheet;
stacking a plurality of said coated sheets with the node bond lines in appropriate juxtaposition, to provide a honeycomb structure on curing and expansion;
curing said node bond adhesive at an elevated temperature;
expanding said stack of sheets with the aid of a warm hydroxylic media;
coating said expanded honeycomb structure with a second sinterable metal-resin composition; and
drying and sintering said expanded stack to provide a stable metal or metal alloy honeycomb structure.

14. A method according to claim 13, wherein said metal is a powder of a size less than 250 mesh and said first metal-resin composition provides a minor proportion of the total metal of said metal honeycomb structure.

15. A method according to claim 13, wherein at least one member of the group of metals copper, nickel, iron, cobalt, chromium, manganese, vanadium, molybdenum, or lanthanum is present as the metal or oxide.

16. A method according to claim 13, wherein prior to sintering, all organic material is burned off at a temperature below 1500° F and the sintering is carried out in a non-oxidizing environment.

17. A method according to claim 13, wherein said resin of said first coating is a partially hydrolyzed acrylic resin, while the resin in subsequent coatings is a partially hydrolyzed ester resin.

18. A method for preparing a stable metal honeycomb having at least one of the metals of the group copper or nickel which comprises:
coating a porous paper carrier of from 5 to 10 pounds per ream with a copper and/or nickel-resin composition dispersed in a hydroxylic medium, wherein said resin composition is present in from 15 to 35 weight percent of said copper and/or nickel-resin composition, and is from about 65 to 90 weight percent of a carboxy modified acrylate resin and from 10 to 35 weight percent of a compatible ester plasticizer, to provide a lightly coated sheet;
curing said resin composition at an elevated temperature;
printing node bond adhesive lines on one surface of said coated sheet;
stacking a plurality of said coated sheets with the node bond lines in appropriate juxtaposition to provide a honeycomb structure on curing and expansion;
curing said node bond adhesive at an elevated temperature and under a mild positive pressure;
expanding said stack of sheets with the aid of a warm hydroxylic media;
coating the expanded stack of sheets with a second copper and/or nickel-resin composition, wherein the copper and/or nickel is present in at least 85 weight percent of the copper and/or nickel-resin composition;
drying and burning organic matter at a temperature below 1500° F in an oxidizing environment; and
sintering said copper and/or nickel at a temperature above 1500° F in a non-oxidizing environment.

* * * * *

UNITED STATES PATENT OFFICE
CERTIFICATE OF CORRECTION

Patent No. 3,819,439          Dated June 25, 1974

Inventor(s)   Robert S. Taylor

It is certified that error appears in the above-identified patent and that said Letters Patent are hereby corrected as shown below:

In the drawing:

Delete "HOBE", both appearances.

In the specification:

Column 7, line 1, delete "hobe".

Signed and sealed this 10th day of December 1974.

(SEAL)
Attest:

McCOY M. GIBSON JR.
Attesting Officer

C. MARSHALL DANN
Commissioner of Patents